US005598834A

United States Patent [19]
Grady

[11] Patent Number: 5,598,834
[45] Date of Patent: Feb. 4, 1997

[54] PORTABLE OUTDOOR FIREPLACE WITH CONVERTIBLE GRILL FEATURE

[76] Inventor: Jeff Grady, 2009 Fair Oak Ct., Naperville, Ill. 60565

[21] Appl. No.: 564,379

[22] Filed: Nov. 24, 1995

[51] Int. Cl.⁶ .................................................. F24B 1/182
[52] U.S. Cl. ............................ 126/506; 126/519; 126/276
[58] Field of Search .................................... 126/512, 519, 126/547–550, 29, 9 R, 30, 276, 200, 224, 213, 222, 25 R, 506; 110/240–242

[56] References Cited

U.S. PATENT DOCUMENTS

| | | |
|---|---|---|
| D. 293,191 | 12/1987 | Stephen et al. . |
| 1,279,033 | 9/1918 | Stollberg . |
| 2,619,951 | 12/1952 | Kahn . |
| 2,962,019 | 11/1960 | Lundgren . |
| 3,096,706 | 7/1963 | Cardwell . |
| 3,220,400 | 11/1965 | Yager ........................................ 126/550 |
| 3,230,948 | 1/1966 | Schmitt . |
| 3,421,433 | 1/1969 | Vitale . |
| 3,494,349 | 2/1970 | Allen . |
| 3,499,432 | 3/1970 | Hannebaum ............................. 126/519 |
| 3,809,058 | 5/1974 | Becker ..................................... 126/547 |
| 3,999,472 | 12/1976 | Einto . |
| 4,112,913 | 9/1978 | Shimek ..................................... 126/519 |
| 4,120,237 | 10/1978 | Mecherlen . |
| 4,167,177 | 9/1979 | Wiggins . |
| 4,216,760 | 8/1980 | Wiggins ................................... 126/548 |
| 4,233,890 | 11/1980 | Jansen . |
| 5,094,223 | 3/1992 | Gonzalez . |
| 5,421,321 | 6/1995 | Ward ....................................... 126/519 |

*Primary Examiner*—James C. Yeung
*Attorney, Agent, or Firm*—Lockwood, Alex, Fitzgibbon & Cummings

[57] ABSTRACT

A portable outdoor fireplace with a fire screen assembly convertible into a cooking grill includes top and bottom cover members and a fire screen assembly extending vertically therebetween. The fire screen assembly is cylindrical and includes multiple screen panels supported vertically therein. One screen panel is removable and insertable into the fire screen assembly and supported horizontally therein to provide a grill surface within the fire screen assembly which may be used for cooking.

21 Claims, 3 Drawing Sheets

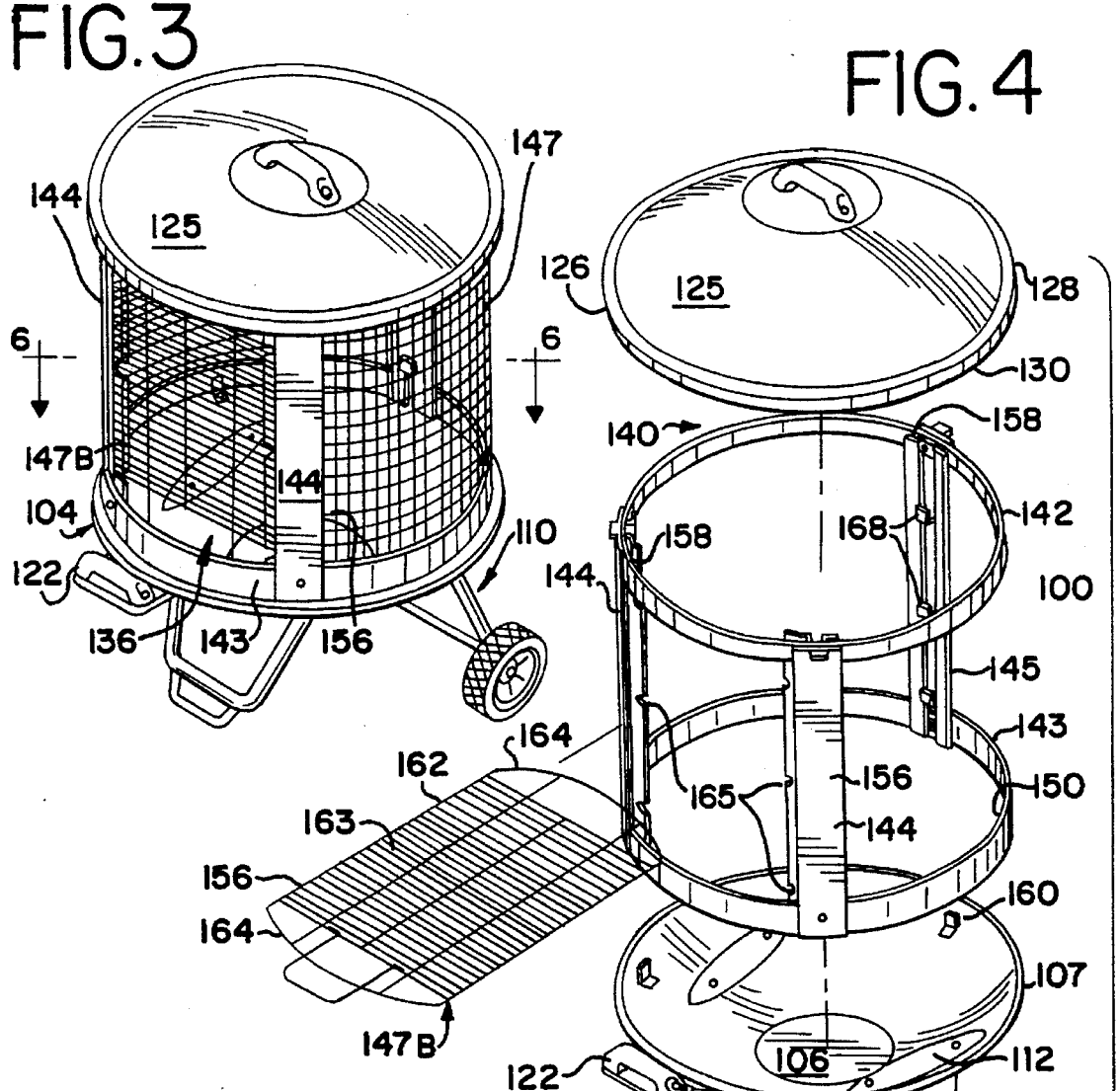

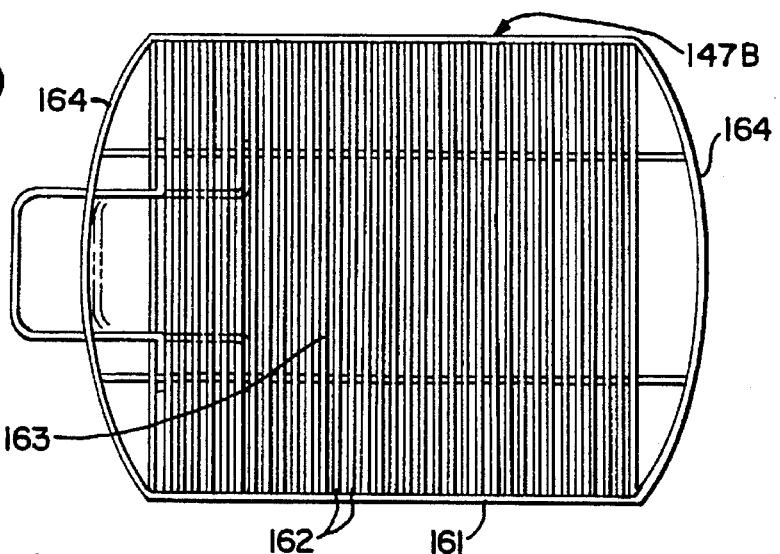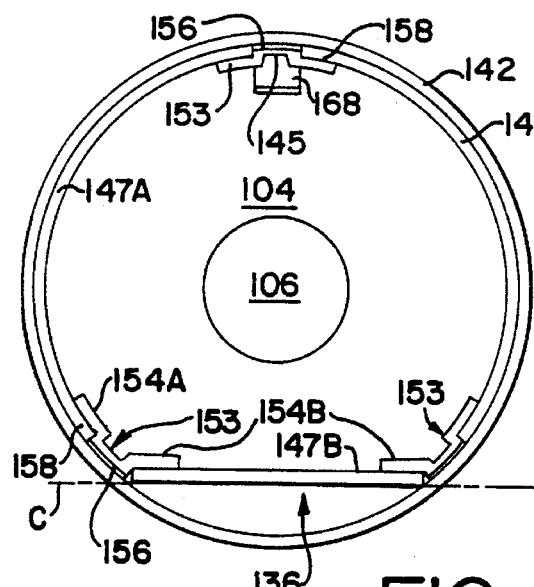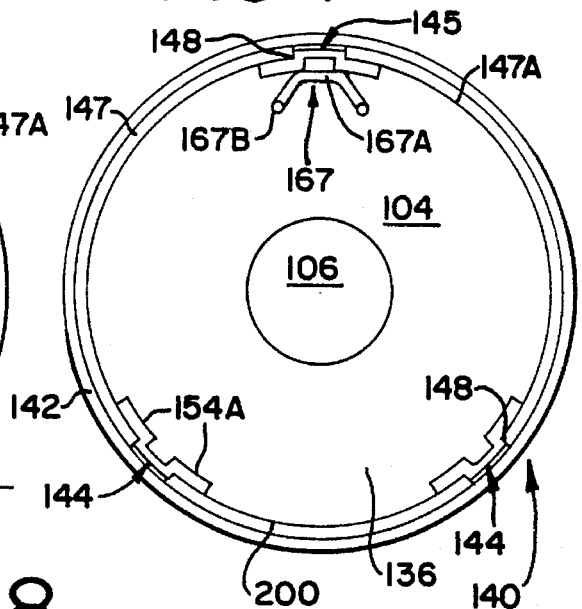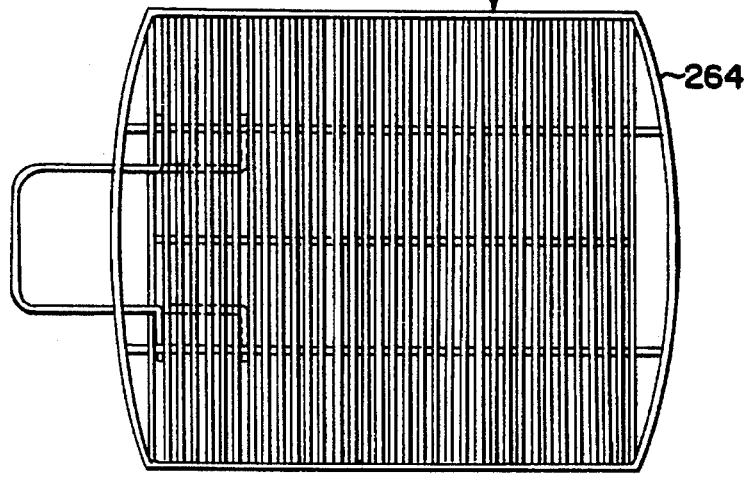

PORTABLE OUTDOOR FIREPLACE WITH CONVERTIBLE GRILL FEATURE

BACKGROUND AND SUMMARY OF THE INVENTION

The present invention generally relates to portable fireplaces, and more particularly, to a portable outdoor fireplace with a convertible grill feature assembly.

Fixed outdoor fireplaces, such as those made from brick, masonry and the like have been known for years. Portable outdoor fireplaces have recently entered the marketplace. Their size is small and their structure is such that it permits them to be easily moved from one location to the other. Such fireplaces are found in the patent literature in U.S. Design Pat. No. 293,191, issued Dec. 15, 1987 and U.S. Pat. No. 5,094,223 issued Mar. 10, 1992.

The 293,191 design patent is assigned to Weber-Stephen Products and describes a portable outdoor fireplace which incorporates the top and bottom covers of the well-known Weber "kettle" grill. The two covers are spaced apart by an internal framework which defines a fire pit area. No grill structure is shown in this patent which would permit cooking.

U.S. Pat. No. 5,094,223, on the other hand describes a portable fire pit having a conical shield which supports a grill thereon so that the fireplace may be utilized for cooking in association with a propane or natural gas burner system. However, the structure of this fireplace is complex and has many parts.

The present invention is directed to a portable outdoor fireplace having a convertible grill feature in which a portion of the fire chamber may be utilized as a grill.

It is therefore an object of the present invention to provide an outdoor fireplace with a convertible grill structure.

It is another object of the present invention to provide an outdoor fireplace having a bottom shell which defines a fire pit area, a fire screen assembly enclosing the fire pit area and having a plurality of fire screen panels, one of the fire screen panels being removable from a screen position therein and insertable horizontally into the assembly to define a grill.

It is yet another object of the present invention to provide a portable outdoor fireplace with a convertible grill feature wherein the fireplace includes opposing base and cover portions and a framework assembly separating the base and cover portions and extending upwardly from the base cover to support the cover portion, the framework assembly supporting a plurality of fire screen panels to define an enclosed fire pit area therewithin, the framework assembly having at least two slotted members which permit one of the fire screens to be removed and inserted horizontally within the framework assembly in order to define a grilling surface of the fireplace.

The present invention accomplishes these objects in accordance with one principal aspect by utilizing a pair of opposing concave members which serve as respective cover and base portions of the fireplace. A fire screen assembly is held between the cover and base portions and stands vertically therein. The fire screen assembly includes a pair of horizontal support rings and vertical columns which cooperate to define a cylindrical frame in which multiple screen panels are supported. The screen panels provide a barrier for the fire screen assembly which retains burning embers and other fire material within the fire pit area defined in the bottom fire bowl. One of the fire screen panels is removable from its screen position in the cylindrical frame and is slidable horizontally into the cylindrical frame to thereby form a horizontal grill surface which functions as a cooking grill.

In another principal aspect of the present invention, the fire screen panel which serves as the cooking grill is a substantially flat panel which is vertically supported in the frame in a manner to retain the flatness of the cooking grill so that the utilization of the grill-screen panel as a grill is not compromised.

In yet another principal aspect of the present invention and as exemplified in a second embodiment of the invention, the grill-screen panel is formed from a highly resilient metal and formed in a pattern which permits the grill-screen panel to flex sufficiently for retention by the framework as a fire screen panel yet "rebound" back into a substantially flat shape when removed from the fire screen framework to effectively serve as a cooking grill when inserted horizontally into the framework assembly.

These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which:

FIG. 3 is a perspective view of the fireplace of FIG. 2, with the fire screen-grill in place as a fire screen;

FIG. 4 is an exploded view of the fireplace of FIG. 2;

FIG. 5 is a plan view of a fire screen/grill member suitable for use in the fireplace of FIG. 2;

FIG. 6 is a sectional view of the fire screen assembly of the fireplace of FIG. 3 taken along lines 6—6 thereof;

FIG. 6A is an enlarged view of a portion of FIG. 6 illustrating the structure of the forward frame column and flanges thereof in detail;

FIG. 7 is a sectional view of a second embodiment of a fire screen assembly suitable for use in fireplaces of the present invention;

FIG. 7A is an enlarged view of a portion of FIG. 7 illustrating the structure of the rear frame column and flanges thereof in detail; and, FIG. 8 is a plan view of a fire screen/grill member used in the fire screen assembly of FIG. 7.

DETAILED DESCRIPTION OF THE PREFERRED EMBODIMENTS

Figure 1:
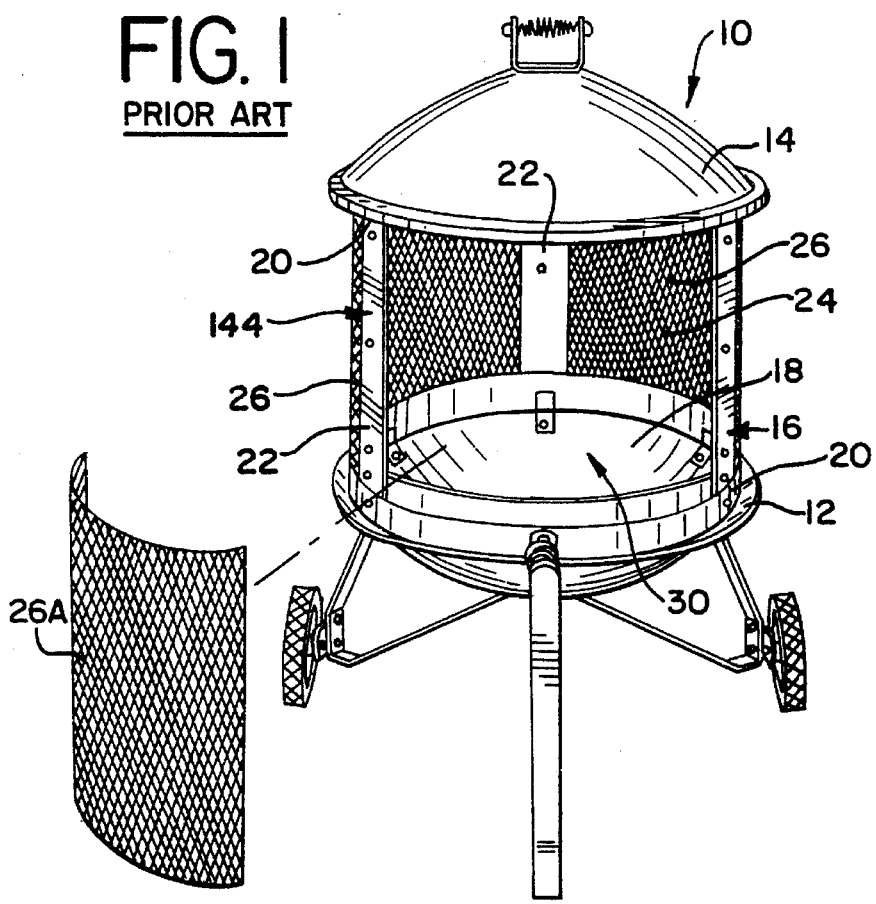
FIG. 1 is a perspective view of a known portable outdoor fireplace.

FIG. 1 illustrates a portable outdoor fireplace 10 of a known type which is representative of certain prior art constructions. The fireplace 10 has a bottom bowl member 12 and a top cover member 14 which are separated by a vertical screen structure 16 which constitutes a fire chamber 18 of the fireplace 10. The screen structure 16 includes top and bottom support rings 20 interconnected by risers 22 which define a series of arcuate openings 24. These openings 24 receive and support a series of curved screen panels 26 vertically therein in a manner to form an enclosed fire chamber which stands in the bottom bowl member 12 into which fire material is placed and burned. One of the curved screen panels 26A is removable while the remaining panels 26 are fixed to the structure, the removable curved screen panel defining an opening 30 in the fireplace 10 through which a user may add additional fuel to the fire pit or stir the material therein.

Figure 2:
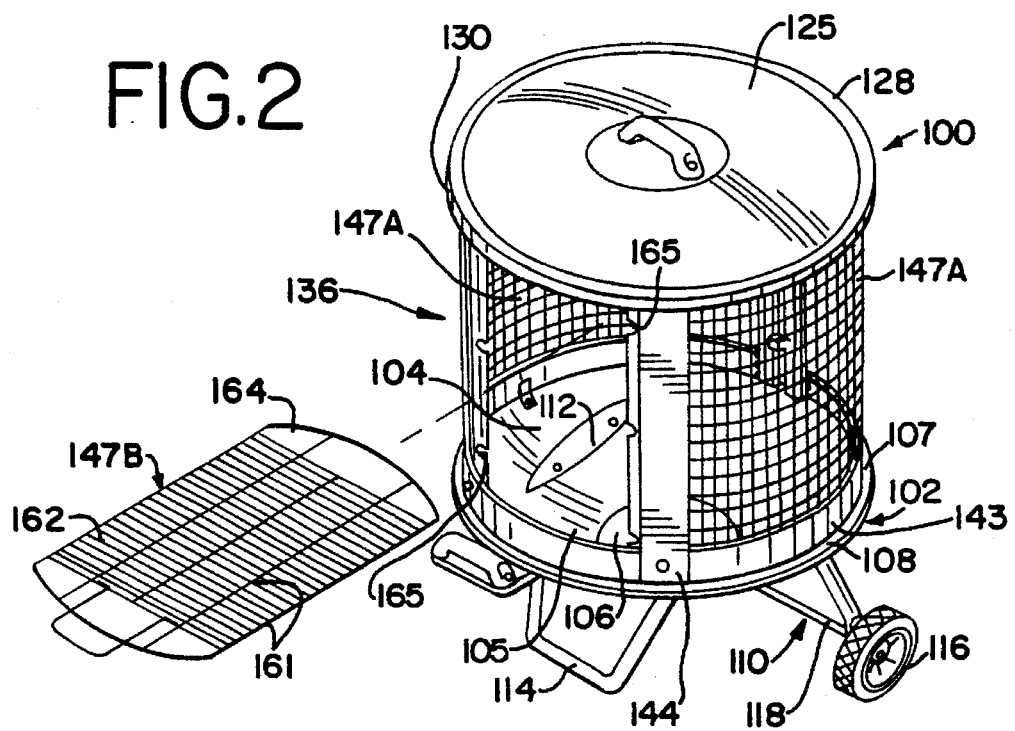
FIG. 2 is a perspective view, partially exploded of a portable outdoor fireplace constructed in accordance with the principles of the present invention illustrating the fire screen-grill in position for insertion into the fireplace.

A portable, convertible outdoor fireplace constructed in accordance with the principles of the present invention is illustrated generally at 100 in FIG. 2. The convertible fireplace 100 includes a lower base member 102 which is preferably conical in shape in order to define a concave receptacle which serves as a fire bowl 104. The bottom 105 of the fire bowl 104 preferably includes a central flat portion 106 which defines a surface suitable for supporting an appropriate fuel in the fire pit, such as logs, charcoal, coal or the like.

A carriage assembly 110 is disposed beneath the fire bowl 104 to support it off of the ground as illustrated, and is attached thereto by suitable means, such as bolts or screws which extend through openings 112 in the receptacle. The carriage assembly 110 includes a tubular chassis 114 having a generally inverted U-shaped configuration which supports a pair of wheels 116 interconnected by an axle 118. This carriage assembly 110 renders the convertible fireplace 100 portable so that it may be easily transported by a user. To facilitate such transport, the fire bowl 104 may include a handle support 120 extending outwardly therefrom, and which provides a base for the attachment of an insulated handle 122.

A top cover 125 is provided for the convertible fireplace 100 and also includes a concave bowl portion 126. The top cover 125 preferably has the same approximate diameter of the base member 102. The cover member 125 may include an outer rim 128 which has a channel 130 formed therein. The channel 130 may engage the outer rim 107 of the fire bowl 104 and also the fire chamber frame assembly 140. The diameters of the cover and base members is such that the engagement which occurs between the cover and base members 125, 102 is preferably tight enough so that the cover member 125 may be used to close off the fire pit area when the fire chamber frame assembly 140 is removed to cut off the flow of air to still-burning embers in the fire pit area.

As depicted in the drawings, the cover and base members 125, 102 are separated from each other by a fire chamber in the form of a frame assembly 140 which extends vertically therebetween. The fire bowl 104 may include an interior channel 108 spaced within its outer rim 107 which provides a support surface for the bottom of the frame assembly 140. The fire chamber frame assembly 140 encloses the fire pit area of the fire bowl 104 and surrounds the fuel which is burned therein. The frame assembly 140 includes a series of frame members 142–145 which are joined together to form a generally cylindrical frame 146 which in turn supports a series of fire screen panels 147A, 147B to form the enclosure.

The frame members include upper and lower circular ring members 142, 143 and column members 144, 145, which interconnect the ring members 142, 143 together to form the cylindrical frame 146. This frame 146 is best illustrated in FIG. 4. The frame ring members 142, 143 may each include two circular beams which are spaced closely together in order to define a circular channel 150 within each of the top and bottom frame rings 142, 143 for retaining the screen panels 147 therein. The frame rings 142, 143 establish a perimeter of the frame assembly 140 and the fire chamber enclosed thereby and further present a circular profile when viewed from an end as in FIG. 6. These channels 150 will receive the respective bottom and top edges of the screen panels 147.

The frame columns 144, 145 are preferably of a multiple piece construction having interior and exterior components which may be bolted, welded, or otherwise fastened together. In the embodiment illustrated in FIGS. 2–6 and as specifically shown in FIG. 6A, the front frame columns 144 include an exterior support plate 156 and an interior flange plate 153. The interior flange plate 152 is stamped and formed in a manner which defines interior flanges 154A, 154B located inwardly of the support plates 152 and spaced apart therefrom in order to define vertical channels, or slots 156, in the columns 144. These vertical slots 156 formed in the frame columns 144 receive the ends 148 of the screen panels 147A.

In one aspect of the present invention, two of the screen panels 147A include curved metal screen sections which approximately match the diameters of the ring members 142, 143 and the fire bowl channel 107. The two screen panels 147A are thus easily received within the frame assembly 140 and match the cylindrical profile of the frame assembly 140. When inserted in place within the frame assembly 140, the two screen panels 147A provide a fire screen which encloses all but a small opening 136 of the fire pit area within the fire bowl 104.

This opening 136 retains a grill-screen panel 147B and provides a point of access to the fire pit area of the fire bowl 104 as well as insertion of the grill-screen panel 147B into the frame assembly 140 as explained more fully below. When all the screen panels 147A, 147B are inserted into the frame assembly 140, they will function to contain hot embers and debris within the fire pit area and to prevent users from contact with the fire due to inadvertence. The frame assembly 140 may be rigidly attached to the base receptacle 104 by way of a series of clips 160 which are affixed to the receptacle 104 and which may engage the frame assembly 140 by way of a suitable means, such as screws (not shown).

In an important aspect of the present invention, the frame assembly 140 is easily converted to a cooking grill by removing the forward fire screen panel 147B from its vertical position within the frame assembly 140 and inserting it into the frame assembly 140 horizontally in order to form a horizontal cooking surface which may effectively function as a grill.

As mentioned above, the forward columns 144 include two sets of flanges 154A, 154B formed in their associated interior flange plates 153. The first set of flanges 154A extend generally parallel to their opposing column support plates 152 to define generally rectangular channels or slots 158 while the second set of flanges 154B do not extend parallel to the support plates 152. Rather, the second flanges 154B extend at an angle $\theta_1$ therefrom, preferably at about approximately 45° from the plane defined by the support plate 152, or at an angle $\theta_1$, about approximately 135° from the edge of the support plate. (FIG. 6A.)

The two forward frame columns 144 are preferably aligned in their positions within the frame assembly 140 such that the second flanges 154B thereof are aligned with each other along an imaginary line C drawn between the two flanges 154B. The line C defines a chord of the perimeter defined by the top and bottom ring members 142, 143. The angular orientation of these flanges 154B importantly permits a substantially flat, and rigid, grill-screen panel 147B to be used to close off the opening 136 of the frame assembly 140 and as a cooking grill without compromising the desirable, flat characteristic of the grill-screen panel 147B.

FIGS. 3 and 6 illustrate a rigid grill-screen panel 147B suitable for use with the fireplace embodiment 100 of FIGS. 1–6. The grill-screen panel 147B has a series of metal grill bars 161, 162 which are welded together to form a rectangular pattern on the grill-screen panel 147B. These bars 161, 162 intersect together in a spacing sufficient to provide a usable grill area 163 to the grill-screen panel 147B in order to support various foods thereupon and serve as a fire screen. The grill-screen panel 147B preferably also includes a handle member 169 which is selectively engageable therewith in at least two different locations on the grill-screen panel 147B to provide a means for inserting and removing the grill-screen panel 147B into the frame assembly 140.

The opposing ends 164 of the grill-screen panel 147B may be curved in an arc which is preferably generally no greater than either the curvature of the perimeter of the fire chamber or of the arcs defined by the top and bottom cover members 125, 102 along vertical sections taken therethrough along the chord C of the frame assembly column second flanges 154B. This curvature relationship permits the end 164 of the grill-screen panel 147B to engage the frame column 145 without interference with the interior of the frame assembly 140 of the screens panels 147 thereof.

In another important aspect of the present invention, the frame columns include means for supporting the grill-screen panel 147B horizontally within the frame assembly 140 in a variety of elevations over the fire pit area. The forward frame column flange plates 153 include a series of supports in the form of generally horizontal slots 165 disposed in the second flanges 154B which permit insertion and removal of the grill-screen panel 147B. The rearward frame assembly column 145 cooperates with the forward column slots in supporting the grill-screen panel by means of a series of support bars 167 (FIG. 7A) or support clips 168 (FIGS. 6 & 6A) affixed thereto at elevations equal to those of the flange slots 165 in order to support the grill-screen panel 147B in a level, horizontal orientation in the frame assembly 140. As seen best in FIG. 7A, the support bars 167 are generally U-shaped and include a base portion 167A and two extending arm portions 167B.

Turning now to FIGS. 7A & 8, a second embodiment of a grill-screen panel 200 suitable for use with the present invention is illustrated. This grill-screen panel 200 is formed from a flexible material, such as an aluminum screen stock. This grill-screen panel 200 is flexible, rather than rigid as in the first embodiment, so that it may adopt a curved profile when inserted into the frame assembly 140 in a vertical orientation. In this regard, the forward frame members 144 do not have a second set of flanges 154B as in the first embodiment, but rather include two sets of flanges 154A aligned with the perimeter of the frame assembly 140. The flexibility of the material used for this grill-screen panel 200 permits it to flex back to its substantially flat profile after it is removed from engagement with the flanges 154A. The end 264 of the grill-screen panel 200 is also preferably curved, with a curvature no greater than that of the perimeter of the frame assembly, so that the end 264 may engage the rear frame column 145 without interference from any part of the frame assembly 140. The forward frame columns 144 will contain similar slots to which accommodate the grill-screen panel 200 in a horizontal orientation in the frame assembly 140 over the fire pit area.

While the preferred embodiments of the invention have been shown and described, it will be apparent to those skilled in the art that changes and modifications may be made therein without departing from the spirit of the invention, the scope of which is defined by the appended claims.

I claim:

1. A portable outdoor fireplace, comprising:

a base member for supporting and burning a combustible material therein, a fire screen assembly supported by the base member, the fire screen assembly defining a fire chamber which contains said combustible material within said base member, said fire screen assembly including first and second fire screens panels extending upwardly from said base member in order to provide a protective screen around said combustible material, said fire screen assembly further including an upright frame having a plurality of first and second frame members, one of the first frame members engaging said base member and the second frame members extending upwardly from said one first frame member the first and frame members cooperating to hold the first and second fire screen panels in said frame in a vertical orientation with respect to said base member, said first fire screen panels being removable from said vertical orientation and insertable horizontally into slots disposed in said second frame members, said second frame member slots supporting said first fire screen panel in said frame in a horizontal orientation with respect to said base member, said first fire screen panel defining a fire screen when supported in said vertical orientation frame and defining a cooking grill when supported in said horizontal orientation.

2. The portable outdoor fireplace assembly as defined in claim 1, further including means for supporting said base member off of the ground, said fire bowl support means including a wheeled carriage.

3. The portable outdoor fireplace assembly as defined in claim 1, wherein said first fire screen panel includes a relatively rigid grill member having a substantially flat profile when supported in said frame in said horizontal orientation and said second fire screen panels include screen members having curved profiles.

4. The portable outdoor fireplace assembly as defined in claim 1, wherein said first fire screen panel is formed from a relatively flexible member and has a substantially flat profile when supported in said frame in said vertical orientation and has a substantially curved profile when supported in said frame in said horizontal orientation.

5. The portable outdoor fireplace assembly as defined in claim 1, wherein said second frame members include a pair of columns and said second frame member slots are disposed in said columns to receive and support said first fire screen panel when said first fire screen panel is inserted in said frame in said horizontal orientation.

6. The portable outdoor fireplace assembly as defined in claim 1, wherein said first fire screen panel has a substantially flat profile and said second fire screen panel have substantially curved profiles.

7. The portable outdoor fireplace assembly as defined in claim 1, wherein said fire chamber includes a generally cylindrical enclosure having a given perimeter, said frame partially defining said cylindrical enclosure perimeter, and said first fire screen has at least one curved end portion having a curvature which is no greater than the curvature of said cylindrical enclosure.

8. A portable outdoor fireplace-grill assembly, comprising:

a base member for supporting and burning the combustible material therein, a fire screen assembly supported by the base member, the fire screen assembly defining a generally cylindrical enclosure containing said combustible material within said base member, said fire screen assembly including first and second fire screens panels which provide a protective screen around said combustible material, said fire screen assembly further including a frame including a pair of opposing ring members interconnected by vertical columns which cooperate together with said first and second fire screen panels to define the generally cylindrical enclosure, the frame ring members defining a circular perimeter of said generally cylindrical enclosure, two of said frame columns being spaced apart from each other along said generally cylindrical enclosure perimeter, said two frame columns including respective opposing flanges spaced apart from said ring members and further aligned together such that an imaginary line drawn interconnecting them defines a chord of said generally cylindrical enclosure perimeter, said frame further including a plurality of first and second slots, the frame first slots holding the first and second fire screen panels in said frame in a vertical orientation with respect to said base member, said first fire screen panels being removable from said vertical orientation and insertable horizontally into the frame second slots, said frame second slots supporting said first fire screen panel in said frame in a horizontal orientation with respect to said base member, said first fire screen panel defining a fire screen when supported in said vertical orientation frame and defining a cooking grill when supported in said horizontal orientation.

9. The portable outdoor fireplace assembly as defined in claim 8, wherein said first fire screen panel includes a relatively rigid grill member having a substantially flat profile when supported in said frame in said horizontal orientation and said second fire screen panels include screen members having curved profiles.

10. A portable outdoor fireplace, comprising:
a fire bowl member for supporting and burning the combustible material therein, a fire screen assembly supported on the fire bowl member and extending upwardly therefrom, the fire screen assembly defining a generally cylindrical enclosure containing said combustible material within said fire bowl member, said fire screen assembly including first and second fire screen panels which provide a protective screen around said combustible material, said fire screen assembly further including a frame holding the first and second fire screen panels in an upright orientation with respect to said fire bowl member, said first fire screen panels being removable from said vertical orientation and insertable horizontally into said frame, said frame including means for supporting said first fire screen panel in said frame in a horizontal orientation with respect to said fire bowl member, said first fire screen panel defining a fire screen when supported in said vertical orientation frame and defining a cooking grill when supported in said horizontal orientation.

11. The portable outdoor fireplace assembly as defined in claim 10, further including means for supporting said fire bowl off of the ground.

12. The portable outdoor fireplace assembly as defined in claim 11, wherein said fire bowl support means includes a wheeled carriage.

13. The portable outdoor fireplace assembly as defined in claim 10, wherein said first fire screen panel has a substantially flat profile and said second fire screen panels are curved.

14. The portable outdoor fireplace assembly as defined in claim 10, wherein said frame includes a pair of opposing ring members interconnected by vertical columns which cooperate together with said first and second fire screen panels to define said generally cylindrical enclosure, the frame ring members defining a circular perimeter of said cylindrical enclosure.

15. The portable outdoor fireplace assembly as defined in claim 14, wherein two of said frame columns are spaced apart from each other along said cylindrical enclosure perimeter, said two frame columns including respective opposing flanges angled with respect to said ring members and further aligned together such that an imaginary line drawn interconnecting them defines a chord of said cylindrical enclosure perimeter, whereby said frame column flanges support said first and second screen panels in said vertical orientation in said frame.

16. The portable outdoor fireplace assembly as defined in claim 14, wherein said first fire screen panel supporting means includes at least one pair of opposing slots disposed in said two opposing frame columns which receive and support said first fire screen panel when said first fire screen panel is inserted in said frame in said horizontal orientation.

17. The portable outdoor fireplace assembly as defined in claim 16, wherein said pair of slots include a plurality of horizontal support surfaces which engage said first fire screen panel and support said first fire screen panel in said horizontal orientation in said frame.

18. The portable outdoor fireplace assembly as defined in claim 10, wherein said first fire screen panel has a substantially flat profile and said second fire screen panel have substantially curved profiles.

19. The portable outdoor fireplace assembly as defined in claim 10, wherein said first fire screen panel includes a relatively rigid grill member having a plurality of grill bars arranged thereon to define a substantially flat cooking grill.

20. The portable outdoor fireplace assembly as defined in claim 19, wherein said grill member includes two opposing, curved end portions.

21. A portable fireplace-grill assembly, comprising:
a base member for supporting and burning the combustible material therein, a fire screen assembly supported by the base member, the fire screen assembly defining a generally cylindrical enclosure containing said combustible material within said base member, said fire screen assembly including first and second fire screens panels which provide a protective screen around said combustible material, said fire screen assembly further including a frame including a pair of opposing ring members interconnected by vertical columns which cooperate together with said first and second fire screen panels to define the generally cylindrical enclosure, the frame ring members defining a circular perimeter of said generally cylindrical enclosure, two of said frame columns being spaced apart from each other along said generally cylindrical enclosure perimeter, said two frame columns defining an entrance of said cylindrical enclosure, and said entrance including means for holding a grill panel insertable horizontally into said frame, and supporting said grill panel in said frame in a horizontal orientation with respect to said base member.

* * * * *